(12) United States Patent
Kajitani

(10) Patent No.: US 11,237,784 B2
(45) Date of Patent: Feb. 1, 2022

(54) PRINT CONTROL APPARATUS, PRINTER, PRINT CONTROL SYSTEM, AND NON-TRANSITORY COMPUTER READABLE MEDIUM TO CONFIRM AUTHENTICITY OF A PRINTER USING CHECKSUM VALUE

(71) Applicant: FUJIFILM Business Innovation Corp., Tokyo (JP)

(72) Inventor: Noriyuki Kajitani, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/037,638

(22) Filed: Sep. 29, 2020

(65) Prior Publication Data

US 2021/0279018 A1 Sep. 9, 2021

(30) Foreign Application Priority Data

Mar. 4, 2020 (JP) .............................. JP2020-036948

(51) Int. Cl.
*G06F 3/12* (2006.01)
*G06F 21/64* (2013.01)
*H04L 9/06* (2006.01)

(52) U.S. Cl.
CPC .......... *G06F 3/1238* (2013.01); *G06F 3/1222* (2013.01); *G06F 3/1225* (2013.01); *G06F 21/64* (2013.01); *H04L 9/0643* (2013.01)

(58) Field of Classification Search
None
See application file for complete search history.

(56) References Cited

U.S. PATENT DOCUMENTS

| 5,720,015 | A   | * | 2/1998  | Martin  | G06F 3/1229 |
|           |     |   |         |         | 358/1.15    |
| 2010/0293386 | A1 | * | 11/2010 | Kezzou  | G06Q 50/30  |
|           |     |   |         |         | 713/176     |
| 2013/0077128 | A1 | * | 3/2013  | Ichida  | G06F 3/1268 |
|           |     |   |         |         | 358/1.15    |
| 2014/0009781 | A1 | * | 1/2014  | Pineau  | G06F 21/604 |
|           |     |   |         |         | 358/1.14    |
| 2014/0153024 | A1 | * | 6/2014  | Chen    | G06F 3/1236 |
|           |     |   |         |         | 358/1.14    |
| 2020/0359109 | A1 | * | 11/2020 | Chen    | H04N 21/8352 |

FOREIGN PATENT DOCUMENTS

JP 2000313156 11/2000
JP 2003341181 12/2003

* cited by examiner

*Primary Examiner* — Haris Sabah
(74) *Attorney, Agent, or Firm* — JCIPRNET

(57) ABSTRACT

A print control apparatus includes a processor. The processor is configured to transmit generation condition data to a printer. The generation condition data includes a generation condition for a checksum value. The generation condition is based on identification information of the printer. The processor is also configured to check a first checksum value against a second checksum value to confirm the authenticity of the printer. The first checksum value is generated by the printer according to the generation condition. The second checksum value is generated according to the generation condition on the basis of the identification information of the printer.

13 Claims, 4 Drawing Sheets

PRINT CONTROL APPARATUS, PRINTER, PRINT CONTROL SYSTEM, AND NON-TRANSITORY COMPUTER READABLE MEDIUM TO CONFIRM AUTHENTICITY OF A PRINTER USING CHECKSUM VALUE

CROSS-REFERENCE TO RELATED APPLICATIONS

This application is based on and claims priority under 35 USC 119 from Japanese Patent Application No. 2020-036948 filed Mar. 4, 2020.

BACKGROUND

(i) Technical Field

The present disclosure relates to a print control apparatus, a printer, a print control system, and a non-transitory computer readable medium.

(ii) Related Art

In recent years, the influence of changes in working styles may cause apparatuses (hereinafter referred to as "printers") such as multifunction devices, which have a print function, to be disposed in shared offices and public locations. Users of shared offices and the like share the printers. If printed matter is stolen, confidential information may be leaked.

To prevent such a leak of confidential information, for example, a technique for preventing invalid printing by stopping power supply when an invalid access to the printer is automatically detected has been proposed in Japanese Unexamined Patent Application Publication No. 2003-341181.

A technique of checking the printer ID in each single-page transmission in an environment, in which a printer driver performs image formation and data transfer of each page, has been proposed in Japanese Unexamined Patent Application Publication No. 2000-313156.

However, the technique described in Japanese Unexamined Patent Application Publication No. 2003-341181 fails to prevent invalid printing when the printer itself is replaced with an invalid printer. The technique described in Japanese Unexamined Patent Application Publication No. 2000-313156 fails to prevent invalid printing if the printer is replaced with a printer in which an invalid program is installed, and if the invalid program operates so as to return the printer ID of the valid printer. In addition, to confirm the authenticity of a printer, the printer ID needs to be checked in each single-page transmission.

SUMMARY

Aspects of non-limiting embodiments of the present disclosure relate to a technique of detecting replacement with an invalid printer in such a manner that confirmation of the authenticity of a printer is not performed in each transmission of print data to the printer.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a print control apparatus including a processor. The processor is configured to transmit generation condition data to a printer. The generation condition data includes a generation condition for a checksum value. The generation condition is based on identification information of the printer. The processor is also configured to check a first checksum value against a second checksum value to confirm the authenticity of the printer. The first checksum value is generated by the printer according to the generation condition. The second checksum value is generated according to the generation condition on the basis of the identification information of the printer.

BRIEF DESCRIPTION OF THE DRAWINGS

Exemplary embodiment of the present disclosure will be described in detail based on the following figures, wherein.

DETAILED DESCRIPTION

A desirable exemplary embodiment of the present disclosure will be described below on the basis of the drawings.

Figure 1:
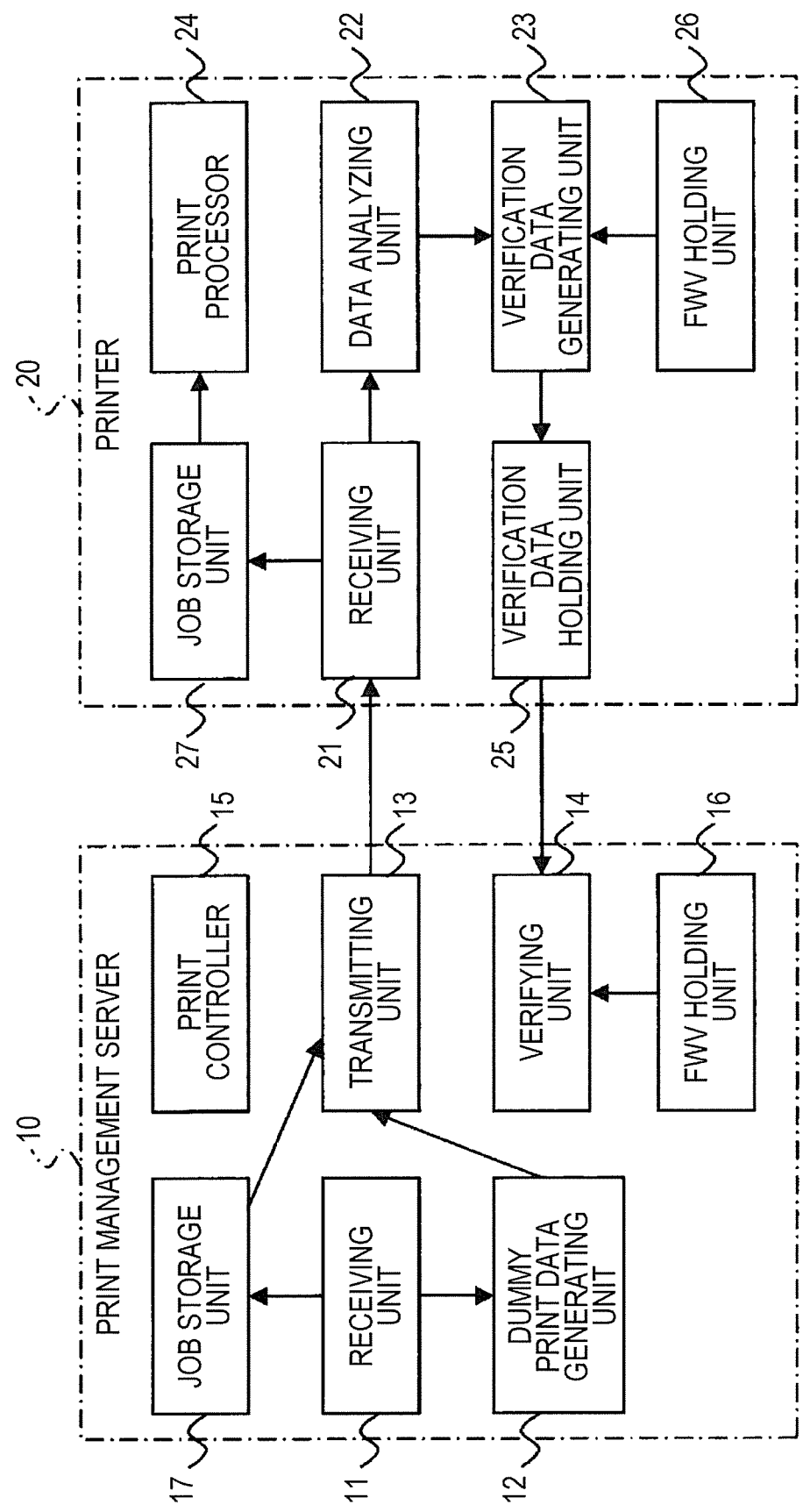
FIG. 1 is a diagram illustrating functional blocks of a print control system according to the present exemplary embodiment.

FIG. 1 is a diagram illustrating functional blocks of a print control system according to the present exemplary embodiment. FIG. 1 illustrates a print management server 10 and a printer 20. The print management server 10 and the printer 20 are disposed typically in an environment such as a shared house used by multiple users who do not have a contractual relationship about security. The print management server 10 is disposed, for example, in a control room so as to be operated only by an administrator. In contrast, the printer 20 is disposed at a place accessible by the multiple users. Unlike the case in which the printer 20 is disposed in a company's office, the printer 20 may be replaced with an invalid printer by an unauthorized person.

The print management server 10 is a print control apparatus which receives and manages print jobs transmitted over networks by users using information processing apparatuses (not illustrated) such as personal computers (PCs), and which controls printing. The print management server 10 according to the present exemplary embodiment may be implemented by using a general-purpose server computer which has been used. That is, the print management server 10 includes a processor such as a central processing unit (CPU), a storage unit for storing print jobs, such as a read-only memory (ROM), a random-access memory (RAM), and a hard disk drive (HDD), a network interface, and a user interface when necessary.

The printer 20 is an apparatus which has a print function, such as a printer or a multifunction device. The printer 20 receives print jobs transmitted over a network from the print management server 10, and performs printing. The printer 20 according to the present exemplary embodiment has a general-purpose apparatus configuration which has been used. That is, the printer 20 includes a processor such as a CPU, a storage unit for storing print jobs, such as a ROM, a RAM, and an HDD, a print engine which prints images on output sheets in accordance with instructions from a control program executed by the CPU, a network interface, and a user interface when necessary.

Back to FIG. 1, the print management server 10 includes a receiving unit 11, a dummy print data generating unit 12, a transmitting unit 13, a verifying unit 14, a print controller 15, a firmware version (FWV) holding unit 16, and a job storage unit 17. Components, which are not used in the description about the present exemplary embodiment, are not illustrated in FIG. 1.

The receiving unit 11 receives print jobs and print instructions which are transmitted from PCs used by users. The dummy print data generating unit 12 generates dummy print data in accordance with the print instructions from the users. The dummy print data is a form of generation condition data including a generation condition for generating a checksum value on the basis of identification information of the printer 20. In the present exemplary embodiment, the generation condition data, which has a format similar to print data (that is, a print job) but which is pseudo print data which does not involve printing, is generated and is transmitted to the printer 20. Thus, the generation condition data is called "dummy print data". The generation condition data, which is transmitted to the printer 20 in a form of pseudo print data, makes it difficult to detect, from the outside, the fact that the data transmitted to the printer 20 is the generation condition data. In the present exemplary embodiment, a description will be made by taking, as an example, the case in which the firmware version is used as the identification information of the printer 20. However, the identification information is not limited to the firmware version. For example, the identification information may be any as long as it is information specific to the apparatus, such as the manufacturer's serial number.

The transmitting unit 13 transmits print data to the printer 20. The types of print data include the print job and the dummy print data which does not involve printing. The verifying unit 14 checks reference data, which is generated on the basis of the firmware version of the printer 20 which is held by the firmware version holding unit 16 in the print management server 10, against verification data, which is generated by the printer 20 by using the firmware version of the printer 20 according to the generation condition included in the dummy print data, and thus verifies the authenticity of the printer 20. The reference data and the verification data will be described in detail below.

The print controller 15 controls the operations of the components 11 to 14, and controls operations of the print management server 10 which include control of execution of processes which will be described below and which are characteristic to the present exemplary embodiment. The processes characteristic to the present exemplary embodiment will be described in detail below. In the present exemplary embodiment, only when the authenticity of the printer 20 is confirmed through the verification performed by the verifying unit 14, a print job is transmitted to the printer 20. The firmware version holding unit 16 holds the firmware version of the printer 20. The job storage unit 17 stores print jobs received by the receiving unit 11.

Each of the components 11 to 15 in the print management server 10 is implemented through collaborative operations between the computer, forming the print management server 10, and a program run by the CPU in the computer. The firmware version holding unit 16 and the job storage unit 17 are implemented by using the HDD or the RAM in the print management server 10.

The printer 20 includes a receiving unit 21, a data analyzing unit 22, a verification data generating unit 23, a print processor 24, a verification data holding unit 25, a firmware version (FWV) holding unit 26, and a job storage unit 27. Components, which are not used in the description about the present exemplary embodiment, are not illustrated in FIG. 1.

The receiving unit 21 receives print data transmitted from the print management server 10. The types of print data include the print job and the dummy print data. The data analyzing unit 22 analyzes print data received by the receiving unit 21. If received print data is the dummy print data, the data analyzing unit 22 instructs the verification data generating unit 23 to generate the verification data. If received print data is a print job, the data analyzing unit 22 causes the print processor 24 to perform printing in accordance with the print job.

The verification data generating unit 23 generates the verification data according to the generation condition, which is included in the dummy print data, in accordance with the instruction from the data analyzing unit 22. The print processor 24 performs printing in accordance with the instruction from the data analyzing unit 22. The verification data holding unit 25 holds the verification data, which has been generated by the verification data generating unit 23, as data according to the management information base (MIB) standard in such a manner that the print management server 10 may obtain the verification data.

The firmware version holding unit 26 holds the firmware version of the printer 20. The job storage unit 27 stores print jobs received by the receiving unit 21.

Each of the components 21 to 24 in the printer 20 is implemented through collaborative operations between the computer, forming the printer 20, and a program run by the CPU in the computer. Each of the components 25 to 27 is implemented by using the HDD or the RAM in the printer 20.

The programs used in the present exemplary embodiment may be provided not only through a communication unit but also through storage of the programs in a computer-readable recording medium, such as a compact disc-read-only memory (CD-ROM) or a Universal Serial Bus (USB) memory. The programs provided from the communication unit or a recording medium are installed in the computers, and the CPUs of the computers execute the programs sequentially, thus causing the various processes to be implemented.

As described above, the printer 20 is disposed typically in an environment such as a shared house used by multiple users who do not have a contractual relationship about security. In this case, an unauthorized person may obtain printed matter of a different person. When the printer 20 is disposed in an inconspicuous location, the case in which the printer 20 is replaced with an invalid printer may be assumed. The exemplary embodiment is characterized in that the replacement with an invalid printer may be detected.

Figure 2:
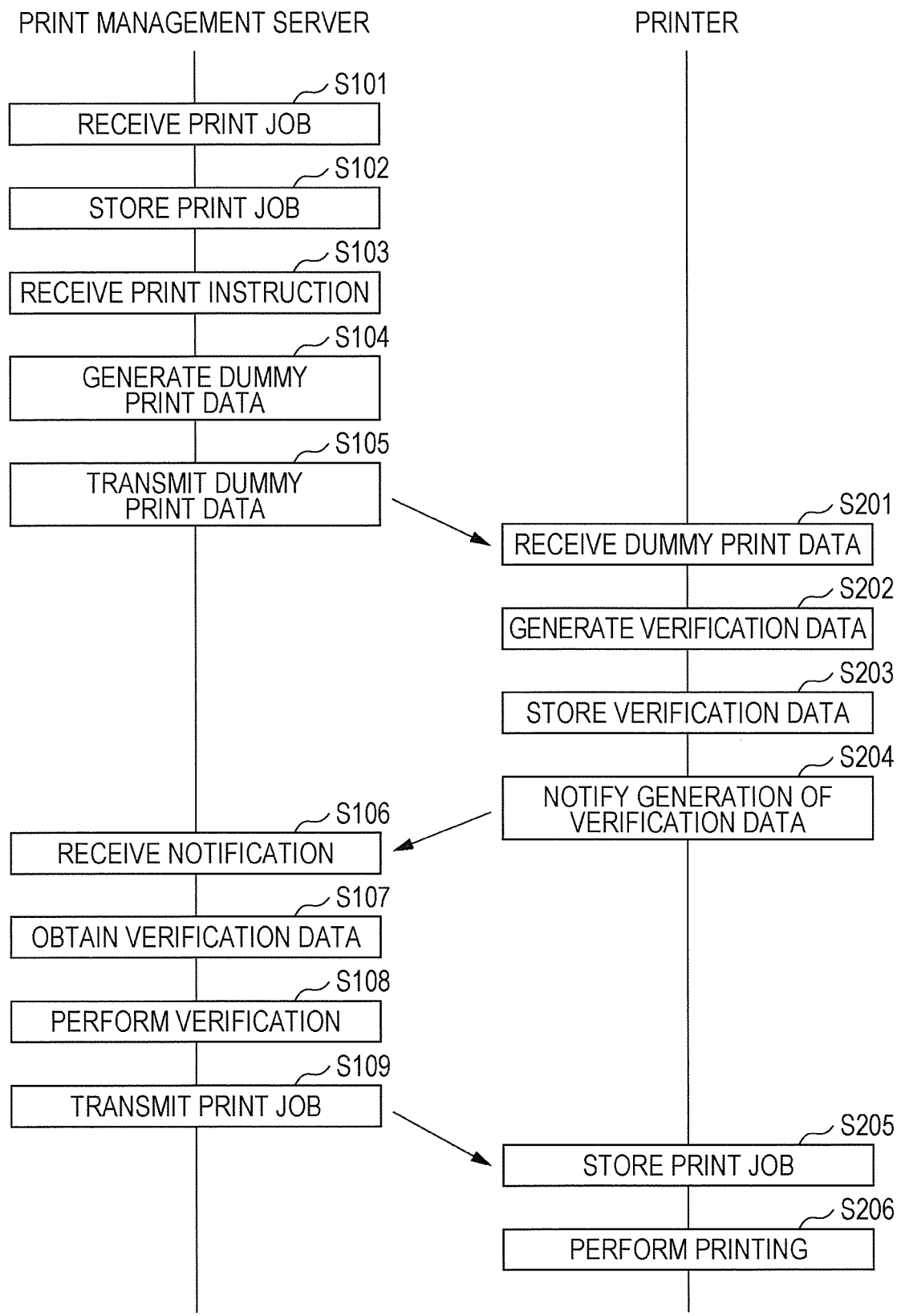
FIG. 2 is a communication sequence chart between a print management server and a printer until printing is performed in response to a user's request, according to the present exemplary embodiment.
Figure 3:
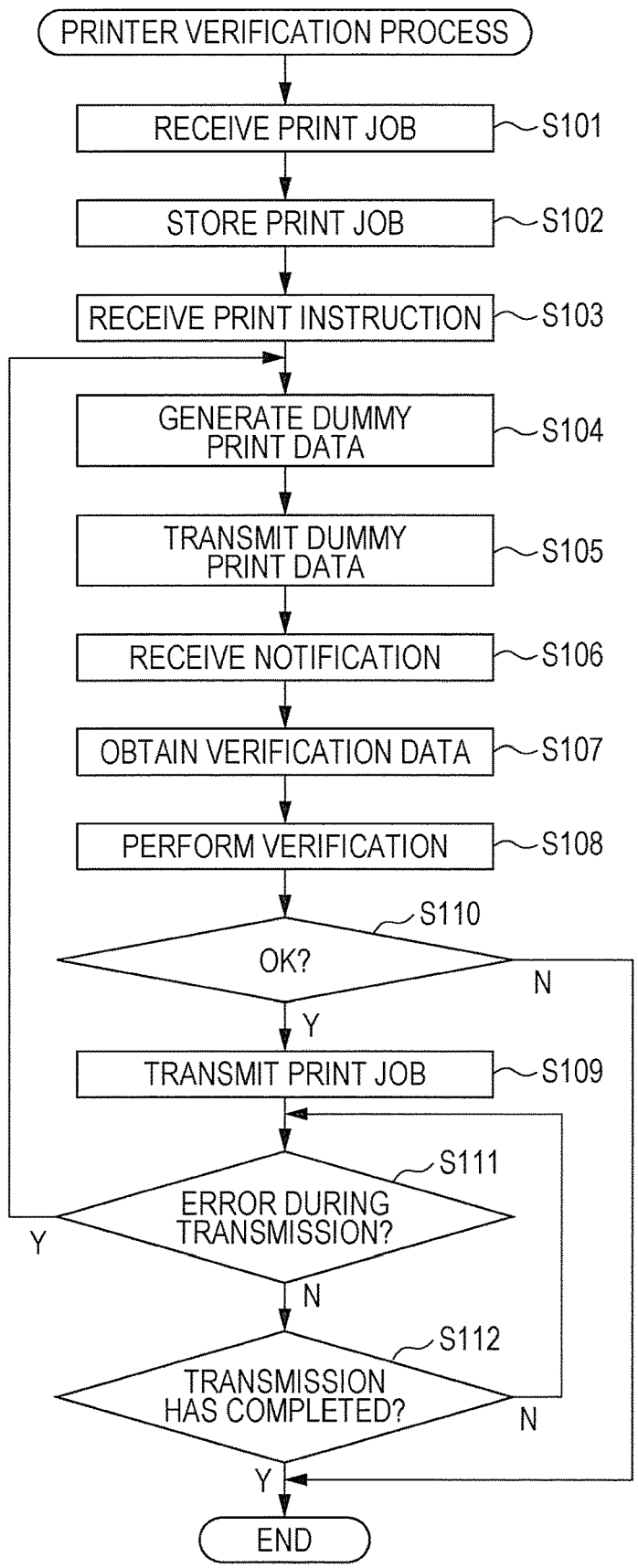
FIG. 3 is a flowchart of a verification process in which a printer is verified and which is performed by a print management server according to the present exemplary embodiment.

FIG. 2 is a communication sequence chart between the print management server 10 and the printer 20 until printing is performed in response to a user's request, according to the present exemplary embodiment. FIG. 3 is a flowchart of a verification process in which the printer 20 is verified and which is performed by the print management server 10 according to the present exemplary embodiment. A process, in which replacement with an invalid printer is detected and which is characteristic to the present exemplary embodiment, will be described below by using FIGS. 2 and 3. In FIGS. 2 and 3, identical processes are designated with identical step numbers.

In FIG. 2, when a user submits a print job from a PC to the print management server 10, the receiving unit 11 in the print management server 10 receives the print job transmitted through the submission (step 101), and stores the print job in the job storage unit 17 (step 102).

When the user transmits an instruction to perform printing for the submitted print job from the PC, the receiving unit 11 of the print management server 10 receives the print instruction (step 103).

When the print controller 15 recognizes reception of the print instruction, the print controller 15 instructs the dummy print data generating unit 12 to generate the dummy print data. The dummy print data generating unit 12 generates the dummy print data in accordance with the instruction (step 104).

Figure 4:
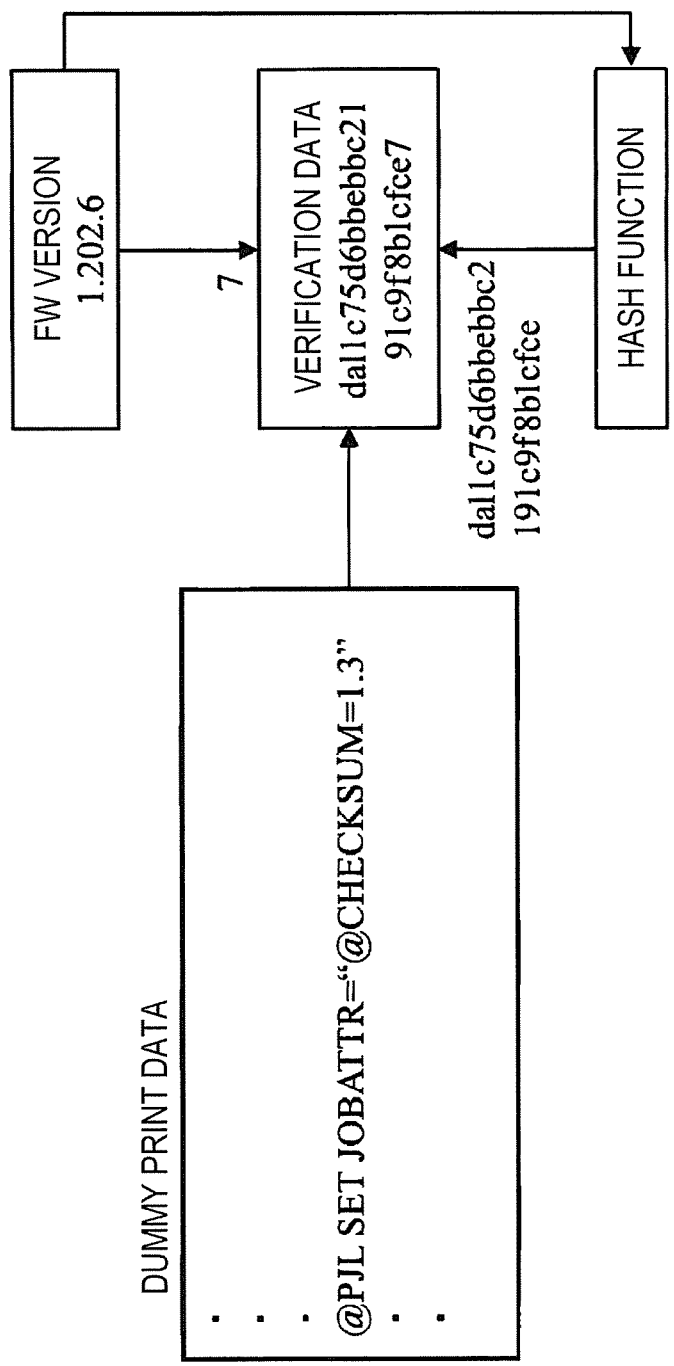
FIG. 4 is a diagram for describing generation of verification data according to the present exemplary embodiment.

FIG. 4 is a diagram for describing generation of the verification data according to the present exemplary embodiment. On the left side of FIG. 4, a part of the job property header included in the dummy print data is illustrated. The job property header is described in a printer job control language called Printer Job Language (PJL). In the dummy print data, a line, '@PJL SET JOBATTR="@CHECKSUM=1.3"', illustrated in FIG. 4 is described. In the present exemplary embodiment, this line corresponds to the generation condition for a checksum value which is based on the firmware version of the printer 20. The printer 20 may recognize that the received print data is the dummy print data, from the fact that this line is included in the job property header. In the generation condition for a checksum value, the part, "1.3", of the line serves as a variable (that is a set value). The variable part is set by receiving a value specified by the dummy print data generating unit 12 automatically or by an administrator or the like. The further details of the dummy print data will be described below.

The transmitting unit 13 transmits the dummy print data, which has been generated by the dummy print data generating unit 12 as described above, to the printer 20 (step 105).

The receiving unit 21 in the printer 20 receives the dummy print data transmitted from the print management server 10 (step 201). The data analyzing unit 22 analyzes the data received by the receiving unit 21. The data analyzing unit 22 recognizes that the received data is the dummy print data, from the fact that the job property header includes '@PJL SET JOBATTR="@CHECKSUM=1.3"'. In this case, the data analyzing unit 22 instructs the verification data generating unit 23 to generate the verification data.

The verification data generating unit 23 generates the verification data in response to the instruction as follows (step 202).

FIG. 4 illustrates a firmware version of "1.202.6". The verification data generating unit 23 uses the firmware version as an input, and uses a preset hash function to obtain a hash value. The hash function is the same as that held by the print management server 10.

In the present exemplary embodiment, the hash function is used to generate the verification data. However, as long as an algorithm, which uses, as an input, the firmware version that is the identification information of the printer 20 and which outputs some value, is used, use of a hash function is not necessary in generating the verification data.

As illustrated in FIG. 4, the firmware version of the printer 20 is formed of three numeric sequences which are separated by periods. The "1.3" of "@CHECKSUM=1.3" indicates that the first and third numeric sequences are used to generate a checksum value. Thus, the verification data generating unit 23 obtains the sum of the first numeric sequence, "1" and the third numeric sequence, "6", of the firmware version, "1.202.6", and calculates a checksum value of "7". The verification data generating unit 23 adds the checksum value to the end of the hash value, thus generating the verification data.

The verification data generating unit 23 stores the verification data, which is generated as described above, in the verification data holding unit 25 (step 203). The verification data generating unit 23 generates the verification data, and informs the print management server 10 of storage of the verification data in the verification data holding unit 25 (step 204).

When the print management server 10 receives the notification that the verification data has been generated (step 106), the verifying unit 14 accesses the verification data holding unit 25 to obtain the verification data (step 107). Then, the verifying unit 14 generates the reference data for checking against the verification data. That is, the verifying unit 14 holds the same hash function as that used in generation of the hash value by the verification data generating unit 23 in the printer 20. The verifying unit 14 obtains the firmware version of the printer 20 from the firmware version holding unit 16, and obtains a hash value by using the obtained firmware version as an input to the hash function. The verifying unit 14 obtains a checksum value from the firmware version of the printer 20 according to the generation condition included in the dummy print data which has been transmitted to the printer 20. The verifying unit 14 adds the checksum value to the end of the hash value, thus generating the reference data.

The verifying unit 14 checks the reference data against the verification data, thus verifying the verification data (step 108). If the printer 20 is a valid printer, the reference data is to match the verification data because the print management server 10 and the printer 20 input the same firmware version of the printer 20 to the same hash function and the same generation condition for a checksum value, and obtain the hash values and the checksum values.

Therefore, the fact that the printer 20 has not been replaced with an invalid printer may be verified from the reference data matching the verification data. That is, the authenticity of the printer 20 may be confirmed.

If the authenticity of the printer 20 is confirmed (Y in step 110), the transmitting unit 13 obtains the print job, for which the print instruction has been transmitted, from the job storage unit 17, and transmits the print job to the printer 20 (step 109).

If the authenticity of the printer 20 is not confirmed (N in step 110), the print controller 15 does not cause the transmitting unit 13 to transmit the print job to the printer 20, and ends the process. In this case, the print management server 10 may have a function of notifying an administrator or the like of replacement of the printer 20 with an invalid printer.

When the print job is transmitted from the print management server 10, the receiving unit 21 receives the print job, and stores the print job in the job storage unit 27 (step 205). The data analyzing unit 22 determines that the print data received by the receiving unit 21 is normal print data, that is, a print job, from the fact that the generation condition for a checksum value is not set in the job property header of the received print data. The print processor 24 obtains the print job for the print instruction from the job storage unit 27 and performs printing in accordance with the instruction from the data analyzing unit 22 (step 206).

According to the present exemplary embodiment, the dummy print data including the generation condition for a checksum value is transmitted to the printer 20 in response to a print instruction from a user; in response to each reception of the dummy print data, the verification data is generated on the basis of the firmware version of the printer 20; the authenticity of the printer 20 may be confirmed on the basis of the generated verification data. Thus, before transmission of the print job to the printer 20 in response to the print instruction, it may be checked whether or not the printer 20 has been replaced with an invalid printer.

According to the present exemplary embodiment, the authenticity of the printer 20 is confirmed before transmission of a print job as described above. However, the printer 20 may be replaced with an invalid printer during data transmission after start of transmission of a print job. Therefore, the present exemplary embodiment enables detection of replacement of the printer after start of transmission of a print job.

To replace the printer 20, the connection between the print management server 10 and the printer 20 needs to be interrupted temporarily. This connection interruption may be detected by the print management server 10 monitoring the communication line, which is connected to the printer 20, all the time.

Interruption of the connection between the print management server 10 and the printer 20 causes an error during data transmission. In this case (Y in step 111), the print controller 15 exerts control as follows: the process is caused to proceed to step 104 after restoration from the data transmission error (that is, after confirmation of reconnection between the print management server 10 and the printer 20) so that the dummy print data is retransmitted to the printer 20. At that time, the variable, which is set to the generation condition for a checksum value which is included in the dummy print data, that is, the previous set value of "1.3" used in generation of a checksum value, is desirably changed.

Assume that a connection interruption between the print management server 10 and the printer 20 occurs even though the printer 20 has not been replaced. In this case, the valid printer 20 calculates a hash value, which is generated by using the firmware version held by the firmware version holding unit 26 as described above, and a checksum value according to the generation condition which has been newly transmitted. Thus, valid verification data is generated. In contrast, the verifying unit 14 of the print management server 10 calculates a hash value, which is generated by using the valid firmware version held by the firmware version holding unit 16, and a checksum value according to the generation condition which has been newly transmitted. Thus, the reference data is generated. Accordingly, the print management server 10 may confirm the authenticity of the printer 20, and may restart transmission of the print job.

In contrast, assume that a connection interruption between the print management server 10 and the printer 20 occurs because of replacement of the printer 20. In this case, the invalid printer stores a firmware version different from that of the valid printer 20. Thus, the verification data generated on the basis of the firmware version does not match the reference data generated by the print management server 10.

The case, in which the firmware version of the valid printer 20 is fraudulently obtained and in which the obtained firmware version is stored in the invalid printer, may occur. However, in the present exemplary embodiment, the verification data includes a checksum value. Even if only the firmware version of the valid printer 20 is fraudulently obtained, replacement of the printer 20 may be detected.

Assume that the verification data is fraudulently obtained before replacement of the printer 20. However, in the present exemplary embodiment, the generation condition, which is included in the dummy print data generated after occurrence of a data transmission error, may be made different from the generation condition included in the dummy print data generated in response to a print instruction. That is, control may be exerted so that the checksum value included in the newly generated verification data does not match the checksum value included in the verification data generated in response to the print instruction. In the present exemplary embodiment, the generation condition for a checksum value is dynamically set. The printer 20 generates the verification data according to the generation condition, which is included in the received dummy print data, every time. Thus, even if the verification data generated in response to the print instruction is fraudulently obtained, replacement of the printer 20 may be detected.

In the present exemplary embodiment, the verification data is generated by using a combination of a hash value and a checksum value, so that confirmation of the authenticity of the printer 20 is performed with higher accuracy. However, only the checksum value may be used as the verification data.

As described above, not only when a print instruction is received from a user, but also when the connection with the printer 20 is interrupted during transmission of print data to the printer 20, the dummy print data is transmitted also at a given timing of restoration from the interruption. Thus, replacement of the printer during transmission of print data to the printer 20 may be detected.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A print control apparatus comprising:
    a processor,
    wherein the processor is configured to
        transmit generation condition data to a printer, the
            generation condition data including a generation condition for a checksum value, the generation condition being based on identification information of the printer, and check a first checksum value against a second checksum value to confirm authenticity of the printer, the first checksum value being generated by the printer according to the generation condition, the second checksum value being generated according to the generation condition on a basis of the identification information of the printer.

2. The print control apparatus according to claim 1, wherein the processor is configured to transmit the generation condition data to the printer at a given timing.

3. The print control apparatus according to claim 2, wherein the given timing is a time at which a print instruction is received from a user, and
wherein the processor is configured to transmit print data to the printer after the confirmation of the authenticity of the printer, the print data being to be printed in accordance with the print instruction.

4. The print control apparatus according to claim 2, wherein the given timing is a time of restoration from an interruption of connection with the printer, the interruption occurring during transmission of print data to the printer.

5. The print control apparatus according to claim 1, wherein the processor is configured to
generate reference data by adding first data to the second checksum value, the first data being output by using an algorithm receiving the identification information of the printer as an input, the second checksum value being generated according to the generation condition,
obtain second data as verification data, the second data being generated by the printer adding third data to the first checksum value, the third data being output by using the identical algorithm, the first checksum value being generated according to the generation condition, and
check the reference data against the verification data to confirm the authenticity of the printer.

6. The print control apparatus according to claim 5, wherein the algorithm is a hash function.

7. The print control apparatus according to claim 5, wherein the identification information of the printer is a firmware version of the printer.

8. The print control apparatus according to claim 1, wherein the identification information of the printer is a firmware version of the printer.

9. The print control apparatus according to claim 1, wherein the generation condition data is pseudo print data which is in a format similar to print data but which does not involve printing.

10. A printer comprising:
a processor,
wherein the processor is configured to
receive generation condition data including a generation condition for a checksum value, the generation condition being based on identification information of the printer,
generate a checksum value according to the generation condition, and
store the generated checksum value in such a manner that a print control apparatus is capable of obtaining the checksum value.

11. A print control system comprising:
a printer that includes a processor and that performs printing;
a print control apparatus that includes a processor and that controls printing performed in the printer,
wherein the processor included in the print control apparatus is configured to
transmit generation condition data to the printer, the generation condition data including a generation condition for a checksum value, the generation condition being based on identification information of the printer, and
check a first checksum value against a second checksum value to confirm authenticity of the printer, the first checksum value being generated by the printer according to the generation condition, the second checksum value being generated according to the generation condition on a basis of the identification information of the printer, and
wherein the processor included in the printer is configured to
receive the generation condition data from the print control apparatus, the generation condition data including the generation condition for a checksum value, the generation condition being based on the identification information of the printer,
generate the first checksum value according to the generation condition, and
store the generated first checksum value in such a manner that the print control apparatus is capable of obtaining the first checksum value.

12. A non-transitory computer readable medium storing a program causing a computer to execute a process comprising:
transmitting generation condition data to a printer, the generation condition data including a generation condition for a checksum value, the generation condition being based on identification information of the printer; and
checking a first checksum value against a second checksum value to confirm authenticity of the printer, the first checksum value being generated by the printer according to the generation condition, the second checksum value being generated according to the generation condition on a basis of the identification information of the printer.

13. A non-transitory computer readable medium storing a program causing a computer to execute a process comprising:
receiving generation condition data including a generation condition for a checksum value, the generation condition being based on identification information of a printer;
generating a checksum value according to the generation condition; and
storing the generated checksum value in such a manner that a print control apparatus is capable of obtaining the checksum value.

* * * * *